(No Model.)
H. J. RICHARDSON.
BRAKE BLOCK.
No. 428,230. Patented May 20, 1890.
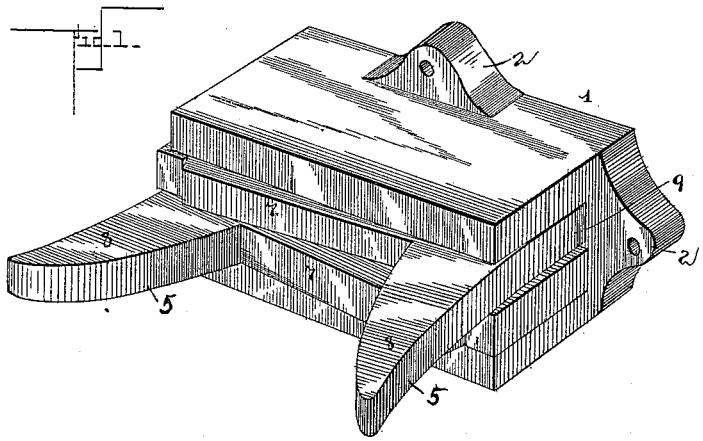
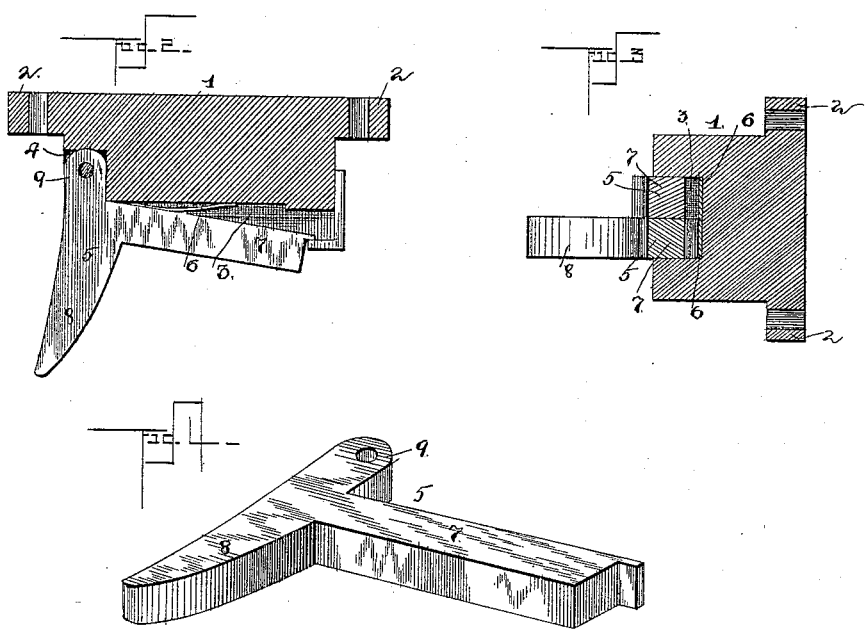
Witnesses
Horace G. Seitz
H. J. Riley
Inventor
Harvey J. Richardson
By his Attorneys,
C. A. Snow & Co.

UNITED STATES PATENT OFFICE.

HARVEY JONES RICHARDSON, OF NORTH STAR, OHIO.

BRAKE-BLOCK.

SPECIFICATION forming part of Letters Patent No. 428,230, dated May 20, 1890.

Application filed March 29, 1890. Serial No. 345,817. (No model.)

*To all whom it may concern:*

Be it known that I, HARVEY JONES RICHARDSON, a citizen of the United States, residing at North Star, in the county of Darke and State of Ohio, have invented a new and useful Brake-Block, of which the following is a specification.

The invention relates to improvements in brake-blocks.

The object of the present invention is to provide a simple, strong, and durable brake-block adapted to frictionally engage a wheel, and when forced into engagement by the brake-lever to clutch the wheel.

The invention consists in the construction and novel combination and arrangement of parts hereinafter fully described, illustrated in the accompanying drawings, and pointed out in the claims hereto appended.

In the drawings, Figure 1 is a perspective view of a brake-block constructed in accordance with this invention. Fig. 2 is a horizontal sectional view. Fig. 3 is a vertical sectional view. Fig. 4 is a detail view of one of the jaws.

Referring to the accompanying drawings, 1 designates a brake-block constructed of suitable metal and provided at each side with perforated ears or flanges 2, through which pass bolts that secure the block to a wagon block or beam. The brake-block is provided with transverse openings 3, that communicate with oppositely-disposed recesses 4, and have arranged in them jaws 5, that are pivoted and are normally held open to receive and engage a wheel by flat springs 6, that are secured to the arm 7, and have their free ends engaging the rear wall of the transverse opening to hold the arms 8 at an angle to each other. The jaws 5 are provided with rearward extensions 9, that form continuations of the arms 8, and are perpendicular to the arms 7 and are pivoted in the recesses 4 of the block. The arms 7 of the pivoted jaws are provided at their ends with projections, which are engaged by L-shaped plates that close the ends of the transverse openings and limit the movement of the pivoted levers and regulate the opening of the jaws. When the brake is applied, the arms 7 engage the wheel frictionally, and when pressure is applied are forced rearward, thereby bringing the arms 8 of the jaws into engagement with the wheel, which is gripped between the said jaws.

It will readily be seen that the brake-block is simple and comparatively inexpensive in construction, and is strong and durable and adapted to engage a wheel and securely lock the same.

What I claim is—

1. The combination of the block 1, provided with the openings 3, and the L-shaped jaws pivoted in the openings and arranged to engage a wheel, substantially as described.

2. The combination of the block 1, provided with the transverse openings 3, the L-shaped jaws pivoted in the said openings and arranged to engage a wheel, and the springs to hold the jaws normally open, substantially as described.

3. The combination of the block 1, provided with the transverse openings, the L-shaped jaws pivoted in the openings and held normally open by springs, and the L-shaped plates arranged to engage the ends of the jaws and limit their movement, substantially as described.

4. The combination of the block provided with the perforated ears 2, and having the transverse openings 3 and the recesses 4 communicating therewith, the L-shaped jaws having extensions 9 pivoted in the recesses and being provided with projections, the L-shaped plates closing the openings and engaging the projections, and the springs to hold the jaws normally open, substantially as described.

In testimony that I claim the foregoing as my own I have hereto affixed my signature in presence of two witnesses.

HARVEY JONES RICHARDSON.

Witnesses:
F. M. BIRT,
S. E. RICHARDSON.